(12) United States Patent
Terayama et al.

(10) Patent No.: US 12,502,848 B2
(45) Date of Patent: Dec. 23, 2025

(54) FIBER PLACEMENT APPARATUS AND METHOD OF MOLDING COMPOSITE MATERIAL

(71) Applicant: SUBARU CORPORATION, Tokyo (JP)

(72) Inventors: Daichi Terayama, Tokyo (JP); Tomoyoshi Kuniya, Tokyo (JP); Shunya Nakanishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 110 days.

(21) Appl. No.: 18/600,133

(22) Filed: Mar. 8, 2024

(65) Prior Publication Data

US 2024/0300190 A1 Sep. 12, 2024

(30) Foreign Application Priority Data

Mar. 10, 2023 (JP) ................. 2023-037675

(51) Int. Cl.
*B29C 70/38* (2006.01)
*B29K 21/00* (2006.01)
(Continued)

(52) U.S. Cl.
CPC ...... *B29C 70/386* (2013.01); *B29K 2021/003* (2013.01); *B29K 2021/006* (2013.01);
(Continued)

(58) Field of Classification Search
CPC .................................................. B29C 70/386
See application file for complete search history.

(56) References Cited

U.S. PATENT DOCUMENTS 4,790,898 A * 12/1988 Woods .................... B29C 70/20
156/441
4,822,444 A * 4/1989 Weingart .............. B29C 53/566
156/441

(Continued)

FOREIGN PATENT DOCUMENTS

JP 2011-527648 A 11/2011
JP 2020-059144 A 4/2020
(Continued)

OTHER PUBLICATIONS

Extended European Search Report issued Jul. 8, 2024 in European Patent Application No. 24158352.5, 5 pages.

*Primary Examiner* — Jeffry H Aftergut
(74) *Attorney, Agent, or Firm* — Finnegan, Henderson, Farabow, Garrett & Dunner, LLP

(57) ABSTRACT

A fiber placement apparatus for arraying prepreg tapes in a width direction, and laminating the arrayed prepreg tapes includes first rollers and a second roller. Each of the prepreg tapes is a material of a fiber reinforced plastic. The first rollers feed out the prepreg tapes one by one. The first rollers rotate around first rotation axes. The second roller arrays the prepreg tapes, fed out from the first rollers, in the width direction, and feeds out the arrayed prepreg tapes slidably. The second roller rotates around a second rotation axis lying on a skew position with respect to each of the first rotation axes. At least one first roller of the first rollers is provided with a first position adjustment mechanism that adjusts a position of the at least one first roller in a first rotation axis direction of the at least one first roller.

12 Claims, 9 Drawing Sheets

(51) Int. Cl.
  *B29K 105/08*  (2006.01)
  *B29K 307/04*  (2006.01)
  *B29K 309/08*  (2006.01)

(52) U.S. Cl.
  CPC .. *B29K 2105/0872* (2013.01); *B29K 2307/04* (2013.01); *B29K 2309/08* (2013.01)

(56) References Cited

U.S. PATENT DOCUMENTS

| | | | |
|---|---|---|---|
| 4,877,471 A | * | 10/1989 | McCowin ........... B29C 53/8016 |
| | | | 156/181 |
| 8,986,482 B2 | | 3/2015 | McCowin et al. |
| 11,379,570 B2 | | 7/2022 | Jammalamadaka et al. |
| 11,597,168 B2 | | 3/2023 | Kawabe et al. |
| 2014/0238612 A1 | | 8/2014 | Vaniglia et al. |
| 2022/0266545 A1 | | 8/2022 | Hirabayashi et al. |

FOREIGN PATENT DOCUMENTS

| | | |
|---|---|---|
| JP | 2020-059145 A | 4/2020 |
| JP | 2022-046379 A | 3/2022 |
| JP | 2022-130133 A | 9/2022 |

\* cited by examiner

FIBER PLACEMENT APPARATUS AND METHOD OF MOLDING COMPOSITE MATERIAL

CROSS REFERENCES TO RELATED APPLICATIONS

This application is based upon and claims the benefit of priority from Japanese Patent Application No. 2023-037675, filed on Mar. 10, 2023. The entire contents of this application are incorporated herein by reference.

BACKGROUND OF THE INVENTION

Field of the Invention

The present invention relates to a fiber placement apparatus and a method of molding a composite material.

Description of Background Art

Japanese Patent Application Publication JP2011-527648A and Japanese Patent Application Publication JP2020-059145A describe AFP (Automated Fiber Placement) apparatuses for automatically laminating prepreg tapes or fiber tapes. Japanese Patent Application Publication JP2022-046379A and Japanese Patent Application Publication JP2022-130133A describe an AFP apparatus which can feed out prepreg tapes from a common roller with a different total width by arraying the prepreg tapes in the width direction with changing an overlap amount between adjacent tapes or by changing the respective widths of the tapes. The entire contents of these publications are incorporated herein by reference.

SUMMARY OF THE INVENTION

According to one aspect of the present invention, a fiber placement apparatus for arraying prepreg tapes in a width direction and laminating the arrayed prepreg tapes includes first rollers that rotate around respective first rotation axes and feed out prepreg tapes one by one, and a second roller that rotates around a second rotation axis lying on a skew position with respect to each of the first rotation axes, arrays the prepreg tapes fed out from the first rollers in the width direction and feeds out the prepreg tapes slidably. At least one of the first rollers has a first position adjuster that adjusts a position of the at least one of the first rollers in a first rotation axis direction of the at least one of the first rollers, and each of the prepreg tapes is a material of a fiber reinforced plastic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
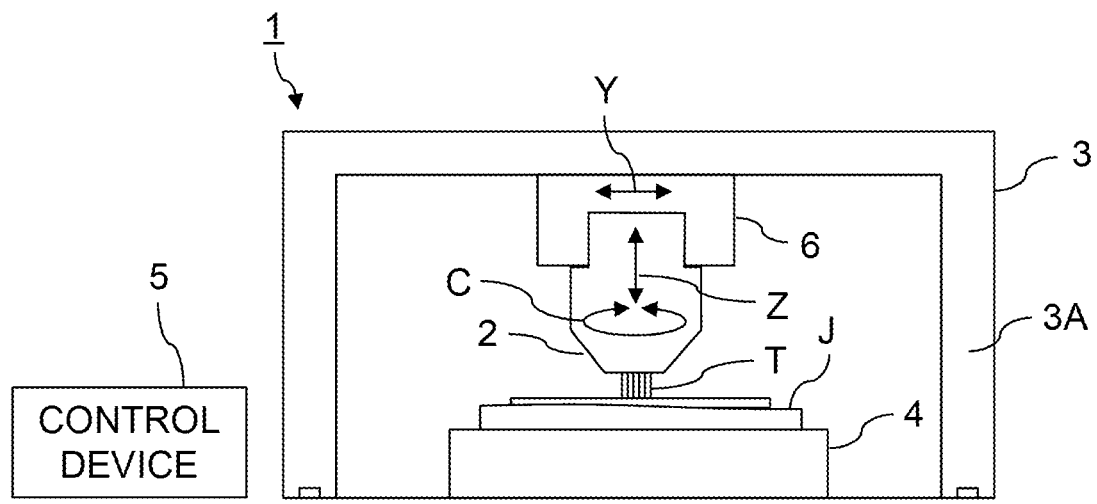
FIG. 1 is a front view showing overall schematic configuration of a fiber placement apparatus according to an embodiment of the present invention.

Embodiments will now be described with reference to the accompanying drawings, wherein like reference numerals designate corresponding or identical elements throughout the various drawings.

A fiber placement apparatus and a method of molding a composite material according to embodiments of the present invention will be described with reference to accompanying drawings.

Configuration and Functions of Fiber Placement Apparatus

Figure 2:
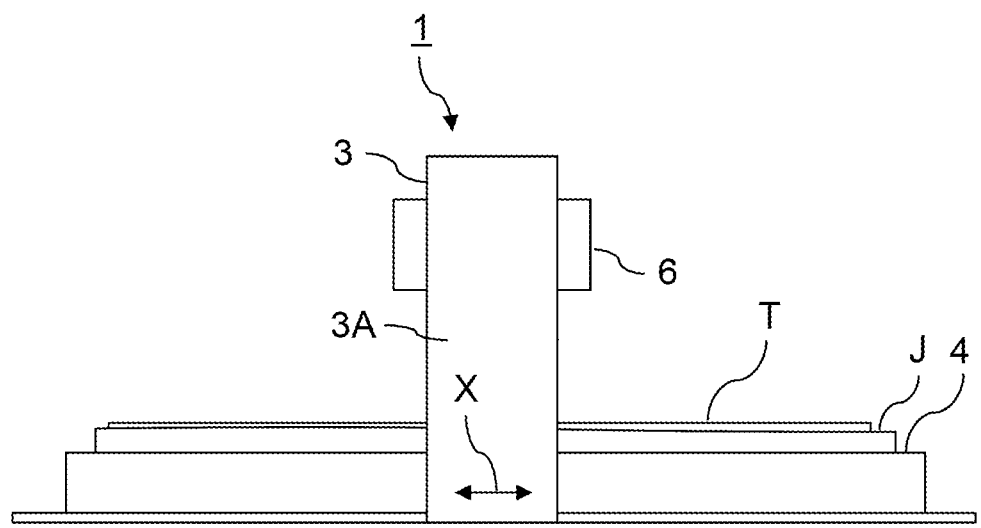
FIG. 2 is a side view of the fiber placement apparatus shown in FIG. 1.

FIG. 1 is a front view showing overall schematic configuration of a fiber placement apparatus 1 according to an embodiment of the present invention. FIG. 2 is a side view of the fiber placement apparatus 1 shown in FIG. 1.

The fiber placement apparatus 1 produces a laminated body of prepreg tapes T, which are material of a composite material formed of an FRP, by laminating the prepreg tapes T. The prepreg is sheet like fibers impregnated with thermoplastic resin or uncured thermosetting resin. The fiber placement apparatus 1 is an automatic lamination apparatus of prepregs, which produces a laminated body of the prepregs using material formed of the rolled prepreg tapes T.

The fiber placement apparatus 1 can be composed of a lamination head 2, a gantry 3 suspending the lamination head 2, a table 4 and a control device 5. The lamination head 2 houses the prepreg tapes T inside, and feeds out the prepreg tapes T on the table 4 by discharging the prepreg tapes T. In particular, the lamination head 2 has a function to dispose the prepreg tapes T in parallel while feeding out the prepreg tapes T on the table 4. For that purpose, the lamination head 2 has creel stands of the prepreg tapes T.

The table 4 is a pedestal for laminating the prepreg tapes T. Although the prepreg tapes T may be directly laminated on the table 4, it is practical to place a lamination jig J, such as a shaping mold, on the table 4 so that the prepreg tapes T may be laminated on the lamination jig J, from a viewpoint of shaping a laminated body of the prepregs and cleaning. Therefore, the prepreg tapes T can be laminated on the table 4 directly or indirectly through the lamination jig J.

The gantry 3 includes a feed structure 6 which moves the lamination head 2 in a desired axis direction, besides supporting structures, such as supporting columns 3A, for supporting the lamination head 2. The feed structure 6 makes the lamination head 2 perform a feeding operation. That is, the feed structure 6 moves the lamination head 2 relatively to the table 4 so that the prepreg tapes T can be fed out toward the table 4 side while changing a lamination position. A feeding direction of the prepreg tapes T toward the table 4 side is opposite to a moving direction of the lamination head 2.

The feed structure 6 rotates the lamination head 2, in addition to typical linear movement of the lamination head 2. Therefore, the prepreg tapes T can be fed out linearly or along a curved line. In other words, a feeding direction of the prepreg tapes T can be changed. A component attached to the lamination head 2 may be rotated instead of rotating a casing itself of the lamination head 2.

In the example shown in FIG. 1 and FIG. 2, the feed structure 6 not only moves the lamination head 2 in parallel along three axis directions orthogonal to each other, including horizontal directions and the vertical direction formed of X-axis, Y-axis and Z-axis, but also rotates the lamination head 2 along a C-axis direction whose rotation axis is the Z-axis in the vertical direction. As a matter of course, at least one tilt axis for inclining the lamination head 2 relative to the surface of the table 4 may be added. Moreover, the table 4 may be moved to the lamination head 2 by the feed structure 6 in addition to the movement of the lamination head 2, or instead of the movement of the lamination head 2.

The moving structure for linearly moving the lamination head 2 and/or the table 4 can be composed of at least one motor, such as an electric motor, a hydraulic motor or a pneumatic motor, circuitry, such as electric circuitry, hydraulic circuitry or pneumatic circuitry, for rotating the at least one motor, and at least one desired machine element, such as wheels, a rack-and-pinion which is one kind of gears, at least one ball screw, or at least one crawler, for converting rotational movement of the at least one motor into linear movement, for example. Alternatively, a moving structure may also be composed of at least one piston and hydraulic circuitry without using any motor.

Meanwhile, the rotating structure for rotating the lamination head 2 can be composed of at least one motor, such as an electric motor, a hydraulic motor or a pneumatic motor, and desired machine elements including a rotating shaft which rotates by power of the at least one motor, for example.

The control device 5 automatically controls the feed structure 6 and the lamination head 2. For example, NC (numerical control) of a spatial position and a rotational moving amount of the lamination head 2 relatively to the table 4 can be performed by controlling the feed structure 6. Moreover, the feeding of the prepreg tapes T from the lamination head 2 can be automatically started and ended as well as the prepreg tapes T can be automatically cut, by controlling the lamination head 2. Although the control device 5 may be built in or attached to the gantry 3, user interfaces, such as operation boards, and heavy components may be placed outside the gantry 3.

When NC control of the lamination head 2 is performed by the control device 5, the control device 5 can be composed of electronic circuitry, such as a computer, into which NC program has been read. Moreover, when the feed structure 6 is a hydraulic system or a pneumatic system, a part of the control device 5 can be composed by hydraulic circuitry or pneumatic circuitry.

Figure 3:
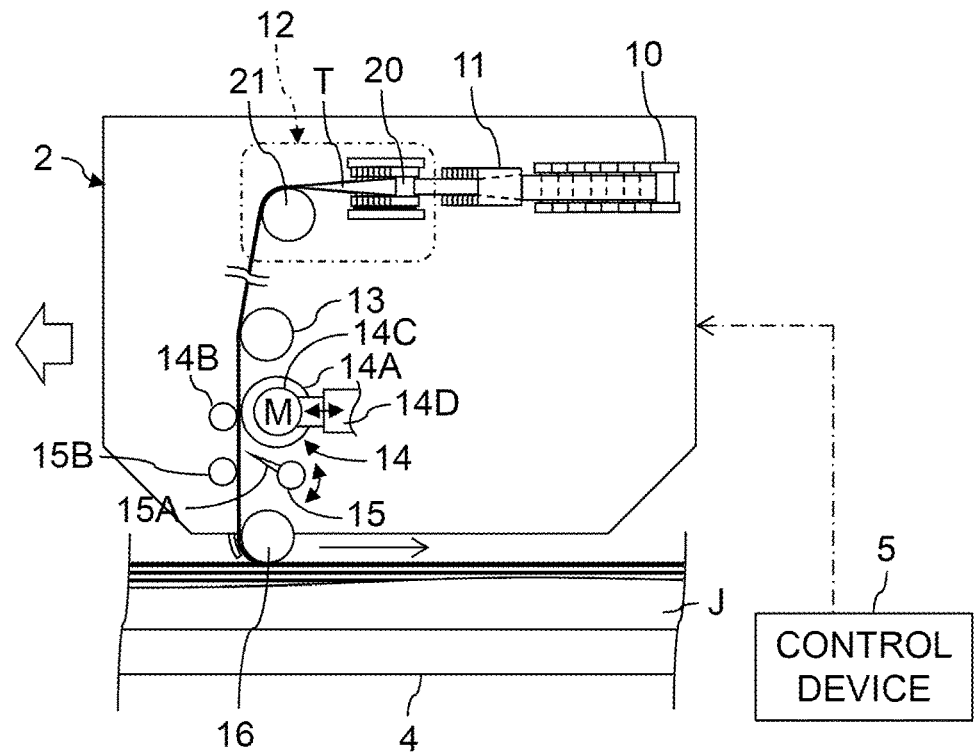
FIG. 3 is a side view showing an example of detailed structure inside and outside the lamination head shown in FIG. 1.

FIG. 3 is a side view showing an example of detailed structure inside and outside the lamination head 2 shown in FIG. 1.

As described above, the lamination head 2 has a function to align the prepreg tapes T in the width direction and feed out the aligned prepreg tapes T onto the table 4. For that purpose, the lamination head 2 can be provided with bobbins 10, width adjusting devices 11, a tape array device 12, at least one tension roller 13, feed rollers 14, a cutter 15 and a compaction roller 16, as exemplified in FIG. 3.

Each of the bobbins 10 is a creel stand of the prepreg tape T having a constant width, and the prepreg tape T is wound on the bobbin 10. The bobbins 10 are provided as many as the number of the tapes T that can be fed out onto the table 4. The number of the tapes T to be fed out onto the table 4 may be decreased by resting or removing a part of the bobbins 10. The widths of the tapes T may be different from each other between the bobbins 10.

The width adjusting devices 11 are disposed in the rear stages of the bobbins 10 respectively, as required. Each of the width adjusting devices 11 changes the width of the tape T, supplied from the corresponding bobbin 10, to a desired width. For example, a device for narrowing the width of the tape T disclosed in Japanese Patent Application Publication JP2020-093454A or a device described in the application documents for Japanese patent application No. 2022-175767 may be used as the width adjusting device 11. Disposing the width adjusting device 11 makes it possible to supply the tape T, supplied from the corresponding bobbin 10, with changing the width of the tape T to a desired width. Conversely, when the width adjusting device 11 is not disposed, the tapes T having widths different from each other can also be supplied by replacing the bobbin 10 with another bobbin 10 corresponding to a different width of the tape T.

The width of the prepreg tape T for an aircraft is standardized in units of inches in many cases. It was confirmed by preform prototype tests that it was desirable to make each of the widths of the tapes T not more than ¼ inch (6.35 mm) from the viewpoint of securing the quality of a preform produced as a laminated body of the prepreg tapes T when steering lamination was performed in which the lamination head 2 was rotated to feed the prepreg tapes T onto the table 4 along a curved line, as described above. Accordingly, the bobbin 10 of the prepreg tape T having a width of ¼ inch or the bobbin 10 of the prepreg tape T having a width of ⅛ inch can be set regardless of whether the width adjusting device 11 is provided.

The tape array device 12 adjusts the interval (pitch) of the tapes T fed out from the bobbins 10 or the width adjusting devices 11, and then arrays the tapes T in a same direction to feed out the tapes T. The detailed configuration of the tape array device 12 will be described later.

Each tension roller 13 is a cylindrical roller for preventing slack of the tapes T fed out in the same direction from the tape array device 12 by applying tension to the tapes T. Tension can be applied to the tapes T by contacting the tension roller 13 with the tapes T so that the advancing direction of the tapes T may be changed.

The feed rollers 14 have power for feeding the tapes T, fed out in a same direction, in the length direction of the tapes T. The feed rollers 14 can be composed of a cylindrical power roller 14A, which is powered, and a cylindrical support roller 14B, which is not powered. The rotating shaft of the power roller 14A is coupled to the output shaft of a motor 14C. Accordingly, the power roller 14A is rotated by the power of the motor 14C. The support roller 14B is a roller for sandwiching the tapes T between the support roller 14B and the power roller 14A.

As a matter of course, both of the two rollers that sandwich the tapes T may be rotated by at least one motor. Gears and/or a one-way clutch may be coupled between the rotating shaft of the power roller 14A and the output shaft of the motor 14C.

The motor 14C for driving the feed rollers 14 can be controlled by the control device 5. Therefore, the start and end of feeding of the tapes T can be controlled by controlling the start and stop of rotation of the motor 14C.

The cutter 15 is a tool for cutting the tapes T when the tapes T fed out in a same direction have been laminated. The operation of the cutter 15 can be controlled by the control device 5.

Although the cutter 15 in the example shown in FIG. 3 is a rotary type in which the cutter 15 is rotated in order to contact a blade 15A of the cutter 15 with the tapes T, the cutter 15 may be moved in parallel in order to contact the blade 15A of the cutter 15 with the tapes T. Moreover, a cylindrical roller 15B may be disposed for sandwiching the tapes T between the roller 15B and the blade 15A of the cutter 15.

The compaction roller 16 is a single cylindrical roller for feeding out the tapes T, fed out in a same direction, toward the table 4 while applying pressure to the tapes T in the thickness direction of the tapes T. The tapes T in the first ply are pressed on the lamination jig J by the compaction roller 16 while the tapes T in the second and subsequent plies are pressed on the lower laminated tapes T adjacent in the thickness direction. Therefore, the compaction roller 16 is a roller that feeds out the tapes T arrayed in the width direction while pressing the arrayed tapes T to the lamination jig J or the tapes T adjacent in the thickness direction.

As the number of the laminated tapes T increases, the height of the tapes T to be newly laminated gradually increases. Therefore, the compaction roller 16 is also moved in the vertical direction. The vertical position of the compaction roller 16 can be adjusted by moving the lamination head 2 vertically in parallel with the feed structure 6. Alternatively, a drive shaft may be provided for moving the compaction roller 16 up and down relatively to the lamination head 2.

Moving the compaction roller 16 so that the tapes T fed out in a same direction may be moved in a horizontal direction relatively to the table 4 allows feeding out the tapes T in a direction opposite to a moving direction of the compaction roller 16. In order to feed out the tapes T in a horizontal direction, the compaction roller 16 is disposed so that the rotation axis of the compaction roller 16 may be almost horizontal.

The lamination jig J or lower laminated tapes T on which the tapes T are to be laminated may have an uneven surface, and therefore the compaction roller 16 itself or the rotation shaft of the compaction roller 16 may have elasticity or flexibility in the vertical direction. In that case, the rotation axis of the compaction roller 16 is not necessarily in the horizontal direction.

After the ends of the tapes T reach the compaction roller 16, the tapes T can be fed out by the pressure applied from the compaction roller 16 without applying tension to the tapes T by the powered feed rollers 14. Then, the feeding speeds of the tapes T become the speeds of the tapes T fed out from the compaction roller 16 respectively. Therefore, after the ends of the tapes T reach the compaction roller 16, it is not preferable to apply excessive tension to the tapes T by the feed rollers 14 since the excessive tension by the feed rollers 14 causes slack or stretch of the tapes T.

Thus, the power roller 14A of the feed rollers 14 may be coupled to a cylinder mechanism 14D exemplified in FIG. 3 or another reciprocating mechanical element, such as a rack-and-pinion or a ball screw. Thereby, the power roller 14A can be retracted from the tapes T after the ends of the tapes T reach the compaction roller 16. Alternatively, the feed rollers 14 may be brought into contact with the tapes T in order to secure the tension of each tape T appropriately. In this case, each tape T is slid on the feed rollers 14. A belt conveyor or a belt conveyor with a suction chuck disclosed in the application documents of Japanese Patent Application No. 2022-013771 may be used instead of the feed rollers 14 or in addition to the feed rollers 14.

When the tapes T may be laminated with gaps thereamong, i.e., when the width of a lamination area is wider than the total width of the tapes T, the tapes T may be fed out from the compaction roller 16 with gaps thereamong. Conversely, the tapes T may be fed out from the compaction roller 16 with overlapping the tapes T with each other in the width direction.

When the tapes T arrayed in parallel without being overlapped with each other in the width direction are fed out from the compaction rollers 16 at different feeding speeds respectively, not only the tapes T to be fed out by the compaction roller 16 but also the tapes T to be fed out by each roller other than the compaction roller 16 are fed out at feeding speeds different among the tapes T. That is, the tapes T are fed out at feeding speeds independent from each other.

Thus, not only the compaction roller 16 but also each of rollers including the at least one tension roller 13, on which non-negligible frictional force is generated due to simultaneous and continuous contact with the tapes T also after the ends of the tapes T disposed in parallel without being overlapped with each other in the width direction reach the compaction roller 16 if the roller was a normal roller, may be formed of a tape feeding roller unit disclosed in the application documents of Japanese patent application No. 2022-153128, which allows the tapes T to be easily fed out at independent feeding speeds respectively. This roller is a cylindrical roller composed of sub-rollers, having the same diameter, and a common support shaft rotatably supporting the sub-rollers.

Next, detailed structure of the tape array device 12 described above will be described.

Figure 4:
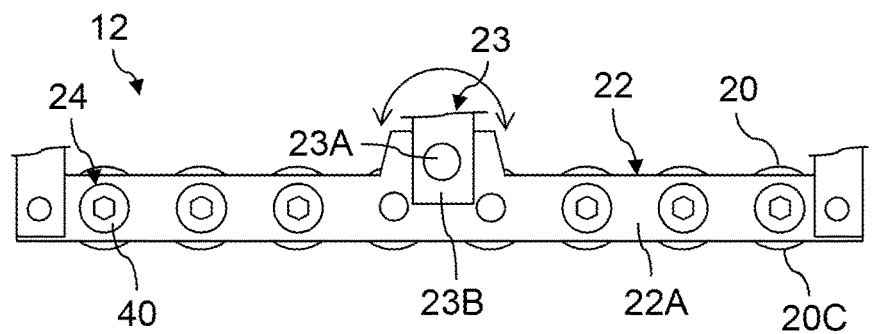
FIG. 4 is a top view showing a detailed structural example of the tape array device shown in FIG. 3.
Figure 4:
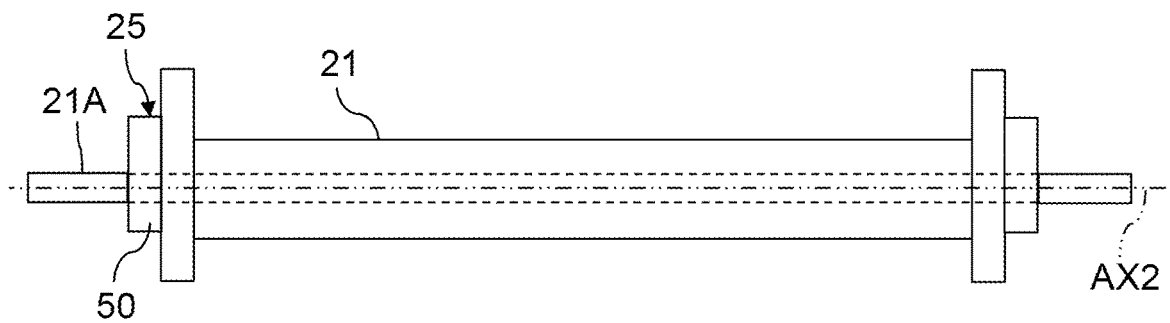
Figure 5:
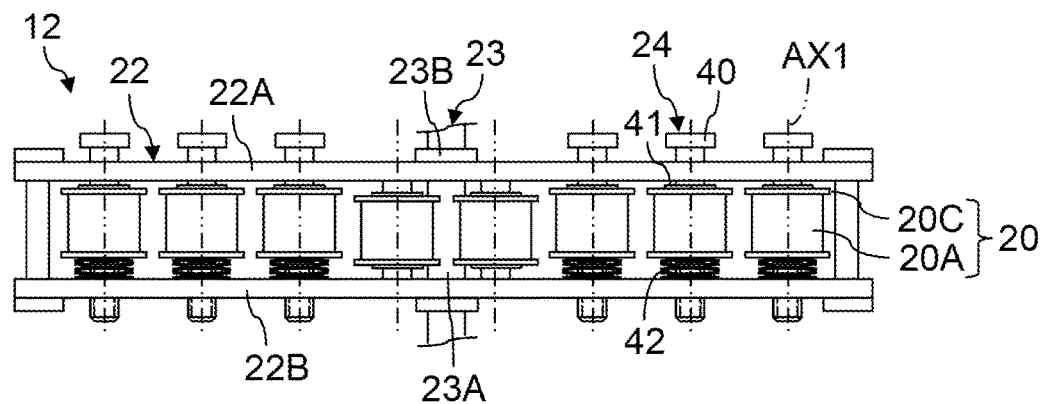
FIG. 5 is a left side view of a portion including pitch adjustment rollers included in the tape array device shown in FIG. 4.

FIG. 4 is a top view showing a detailed structural example of the tape array device 12 shown in FIG. 3. FIG. 5 is a left side view of a portion including pitch adjustment rollers 20 included in the tape array device 12 shown in FIG. 4.

As shown in FIGS. 4 and 5, the tape array device 12 can be composed of pitch adjustment rollers 20, an array roller 21, support frames 22 and a turning mechanism 23. The support frames 22 rotatably hold each of the pitch adjustment rollers 20. The turning mechanism 23 includes a pivot 23A for turning the support frames 22. The turning mechanism 23 may be a desired mechanism, such as a link mechanism having links and joints which rotatably couple the links to each other. Therefore, each support frame 22 for supporting the pitch adjustment rollers 20 may be one of the links included in the turning mechanism 23.

The pitch adjustment rollers 20 are for individually feeding out the prepreg tapes T one by one toward the array roller 21 so as not to slide in the width direction. Therefore, the number of the pitch adjustment rollers 20 is the same as the number of the prepreg tapes T that may be fed out from the bobbins 10 or the width adjusting devices 11.

Each of the pitch adjustment rollers 20 is disposed so that the first rotation axis AX1, which is the rotation center of the pitch adjustment roller 20, may be skewed about the second rotation axis AX2, which is the rotation center of the array roller 21. That is, the pitch adjustment rollers 20 respectively rotate around the first rotation axes AX1 located at skew positions where the first rotation axes AX1 are not parallel to the second rotation axis AX2 of the array roller 21 and do not intersect with the second rotation axis AX2 when the first rotation axes AX1 are extended.

On the other hand, the array roller 21 is a single roller that slidably feeds out the prepreg tapes T fed out from the pitch adjustment rollers 20 while arraying the prepreg tapes T in the width direction. In other words, the array roller 21 is a cylindrical roller for arraying the prepreg tapes T, fed out from the pitch adjustment rollers 20, so that the length directions and the thickness directions of the tapes T may become almost parallel to each other, and then feeding out the arrayed tapes T in a same feeding direction. Therefore, the array roller 21 may be formed of a cylindrical tape feeding roller unit, disclosed in the application documents of Japanese patent application No. 2022-153128, composed of sub-rollers, having the same diameter, and a common support shaft rotatably supporting the sub-rollers, similarly to the compaction roller 16, the at least one tension roller 13 and the like.

The array roller 21 rotates around the second rotation axis AX2 skewed to each of the first rotation axes AX1 of the pitch adjustment rollers 20. Accordingly, each of the prepreg tapes T fed out from the pitch adjustment rollers 20 reaches the array roller 21 after being twisted. Specifically, although the thickness directions of the prepreg tapes T immediately after being fed out from the pitch adjustment rollers 20 are perpendicular to the first rotation axes AX1 of the pitch adjustment rollers 20 respectively, the thickness directions of the prepreg tapes T that have reached the array roller 21 are each perpendicular to the second rotation axis AX2 of the array roller 21.

Figure 6:
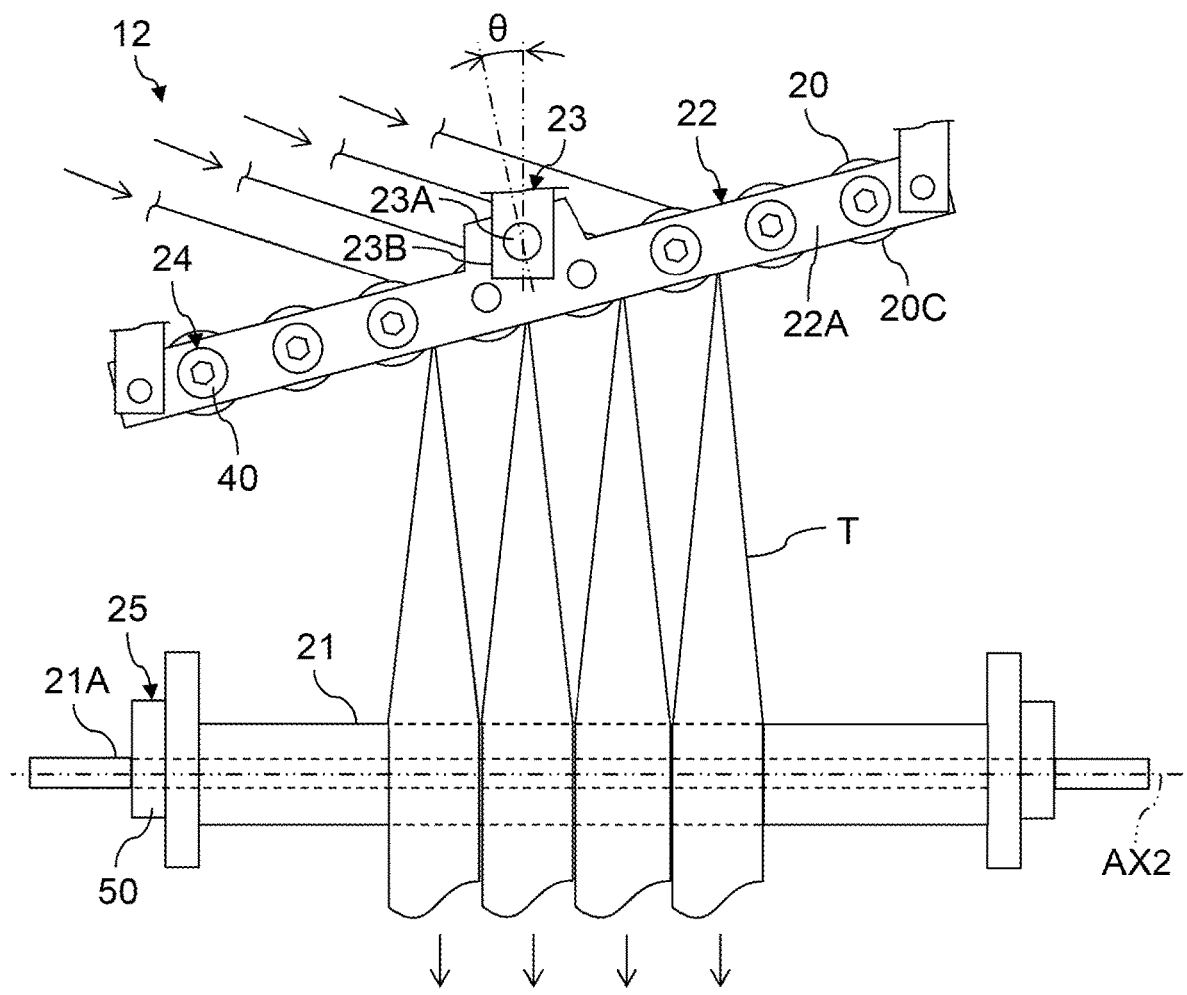
FIG. 6 shows an example of the pitch adjustment rollers shown in FIG. 4 turned by the turning mechanism.

FIG. 6 shows an example of the pitch adjustment rollers 20 shown in FIG. 4 turned by the turning mechanism 23.

When the support frames 22 are turned around the pivot 23A by the turning mechanism 23 as shown in FIG. 6, the pitch adjustment rollers 20 held by the support frames 22 rotates around the pivot 23A. In this case, the intervals among the line segments, which are respectively derived by projecting the first rotation axes AX1 of the pitch adjustment rollers 20 onto a plane including the second rotation axis AX2 of the array roller 21, change depending on the rotation angle of the support frames 22.

Each of the pitch adjustment rollers 20 is a cylindrical roller having flanges formed at an interval determined according to the maximum width of the prepreg tape T. Therefore, the prepreg tape T cannot be slid in the width direction relative to each of the pitch adjustment rollers 20. On the other hand, the prepreg tape T can be each slid in the width direction on the array roller 21.

Accordingly, the pitch of the prepreg tapes T to be fed out from the pitch adjustment rollers 20 toward the array roller 21 can be adjusted by controlling the turning angle θ of the support frames 22 by the turning mechanism 23. More specifically, when the intervals among the line segments which are respectively derived by projecting the first rotation axes AX1 of the pitch adjustment rollers 20 onto a plane including the second rotation axis AX2 of the array roller 21 change, the prepreg tapes T slide in the width direction on the array roller 21 according to the changed intervals. Therefore, it is also possible to adjust the intervals among the arrayed prepreg tapes T to be fed out from the array roller 21.

Although the first rotation axes AX1 of the pitch adjustment rollers 20 do not necessarily have to be parallel to each other to change the pitch of the tapes T, it is realistic to dispose the first rotation axes AX1 in parallel to each other as exemplified in FIGS. 4 to 6 from the viewpoint of simplifying the control of the pitch of the tapes T. In particular, disposing the pitch adjustment rollers 20 and the array roller 21 so that the line segments respectively derived by projecting the first rotation axes AX1 onto a plane including the second rotation axis AX2 may be each perpendicular to the second rotation axis AX2 as exemplified in FIGS. 4 to 6 allows making the interval of the line segments, respectively derived by projecting the first rotation axes AX1 onto a plane including the second rotation axis AX2, a control value of the pitch of the tapes T.

In this case, making the pivot 23A of the turning mechanism 23 parallel to each of the first rotation axes AX1 allows geometrically and easily obtaining the relationship between the pitch of the tapes T and the turning angle θ of the pitch adjustment rollers 20.

The prepreg tapes T arrayed by the array roller 21 are eventually fed out to the compaction roller 16. Accordingly, it is reasonable to dispose the second rotation axis AX2 of the array roller 21 almost horizontally, similarly to the rotation axis of the compaction roller 16. On the other hand, disposing the first rotation axes AX1 of the pitch adjustment rollers 20 vertically as exemplified in FIGS. 4 to 6 leads to a simplified structure and easier control of the tape array device 12.

As described above, the pitch of the prepreg tapes T can be adjusted with the pitch adjustment rollers 20 rotated by the turning mechanism 23, and subsequently the tapes T can be arrayed using the array roller 21 so that the tapes T may be fed out in a same direction.

Although FIGS. 4 to 6 shows an example of feeding out each tape T by the single pitch adjustment roller 20, each tape T may be sandwiched between a pair of the pitch adjustment rollers 20 to be fed out, and/or the pitch adjustment rollers 20 divided into two sets may be turned in a V-shape around the pivot 23A so that the turning radius of the pitch adjustment rollers 20 may be shortened in order to avoid increasing the size of the lamination head 2, as exemplified in Japanese Patent Application Publication JP2022-130133A. Two or more sets of the pitch adjustment rollers 20 may be turned around the pivots 23A.

The lamination head 2 may have the tape array devices 12, and/or the tape array device 12 may have the array rollers 21. In that case, the prepreg tapes T arrayed at an interval are fed out from each array roller 21. Accordingly, sets of the prepreg tapes T arrayed at an interval can be alternately repositioned by another array roller disposed rearward, or using a compaction roller as exemplified in Japanese Patent Application Publication JP2022-130133A.

Figure 7:
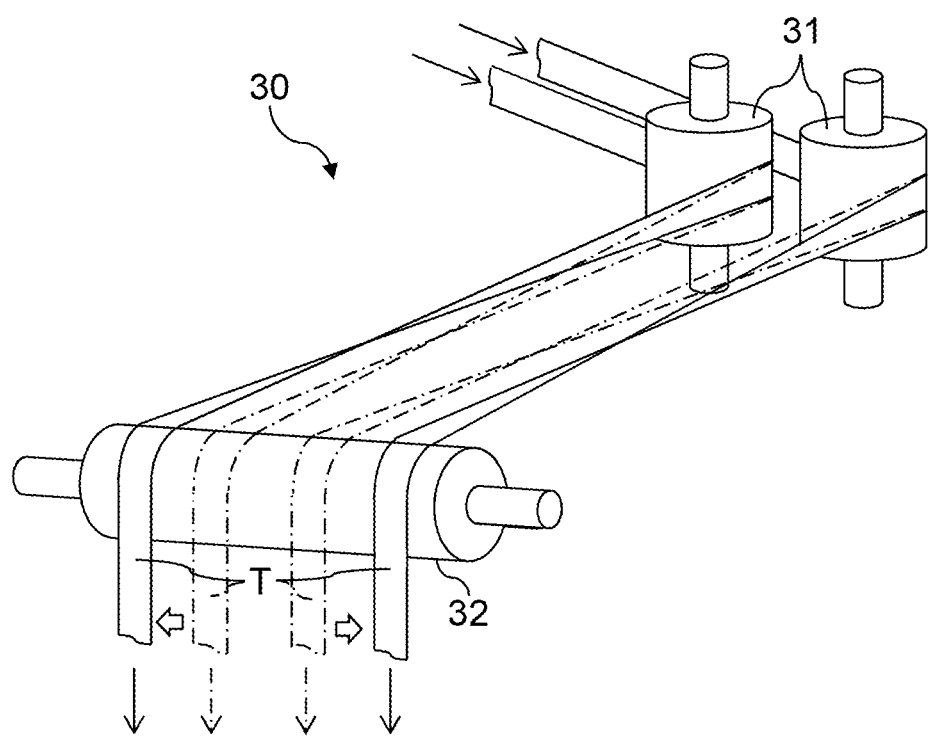
FIG. 7 explains a problem in a conventional tape array device.

FIG. 7 explains a problem in a conventional tape array device 30.

When an attempt is made to array the prepreg tapes T using the conventional tape array device 30 that adjusts the pitch of the prepreg tapes T using pitch adjustment rollers 31 and then arrays the prepreg tapes T using a common array roller 32, the prepreg tapes T often deviate from intended positions on the array roller 32 in the width direction. That is, the pitch of the tapes T fed out from the array roller 32 may not be an intended pitch. This is because each tape T is twisted between the pitch adjustment roller 31 and the array roller 32, and also because each tape T slips in the width direction on the array roller 32.

Accordingly, as shown in FIGS. 4 to 6, at least one of the pitch adjustment rollers 20 is provided with a first position adjustment mechanism 24 that adjusts the position of the pitch adjustment roller 20 in the first rotation axis AX1 direction.

Figure 8:
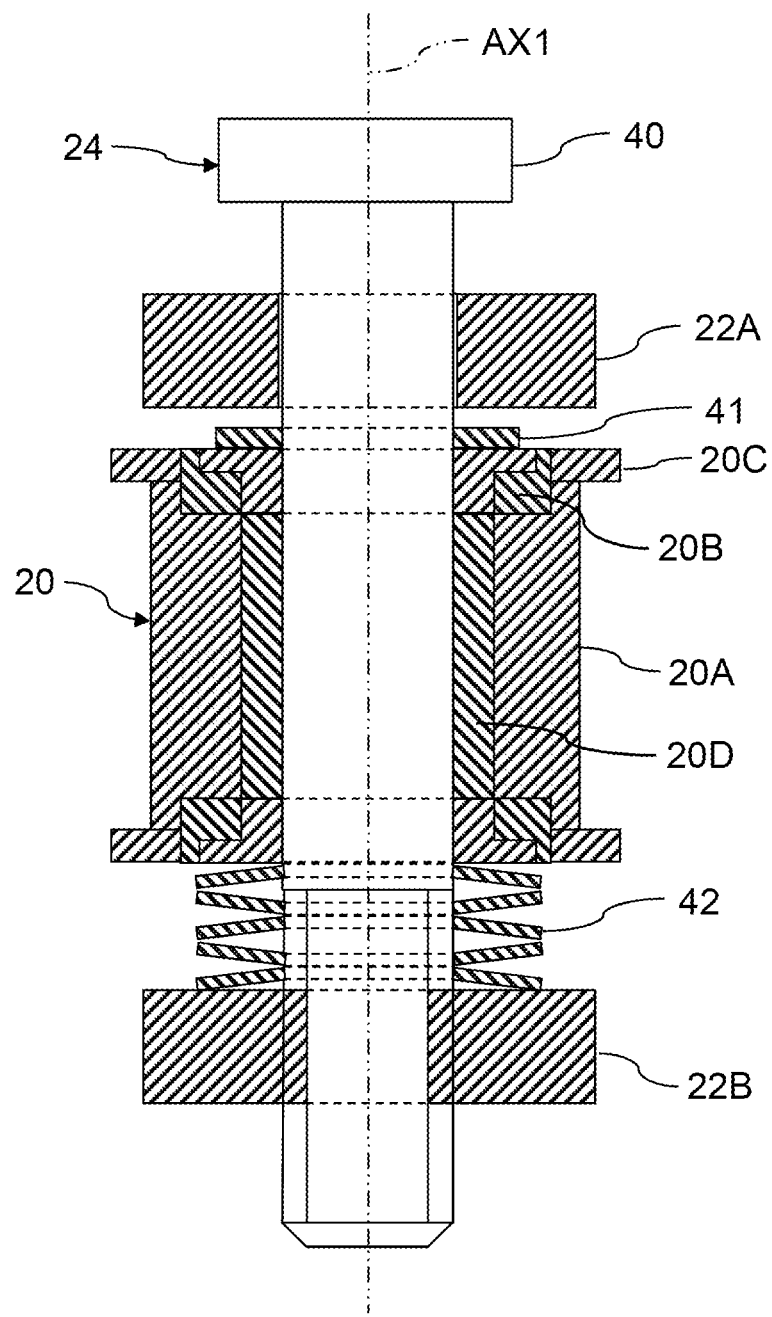
FIG. 8 is a partial longitudinal sectional view of the pitch adjustment roller and the first position adjustment mechanism showing a specific structural example of the first position adjustment mechanism provided with the pitch adjustment roller shown in FIGS. 4 to 6.
Figure 9:
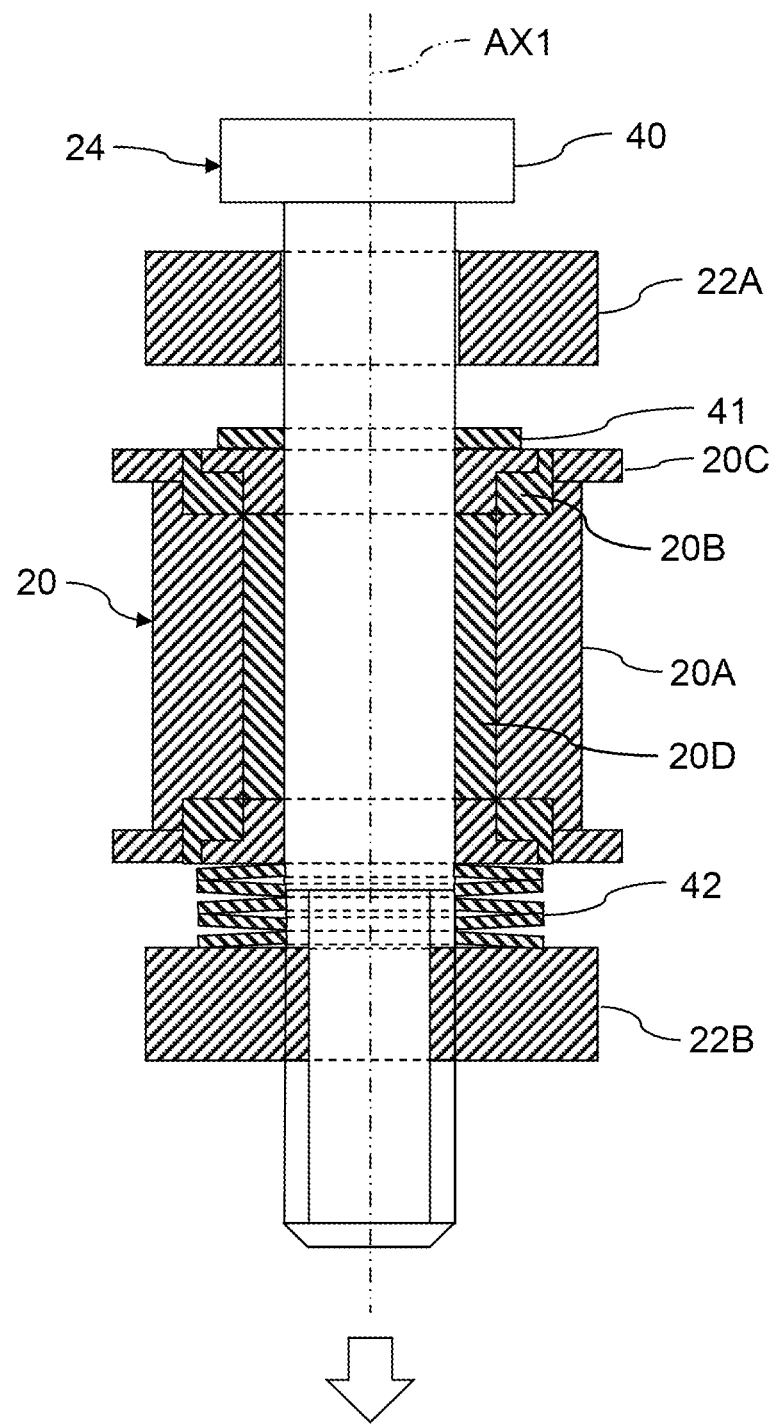
FIG. 9 is a partial longitudinal sectional view of the pitch adjustment roller and the first position adjustment mechanism showing an example of the pitch adjustment roller moved downward by the first position adjustment mechanism shown in FIG. 8.

FIG. 8 is a partial longitudinal sectional view of the pitch adjustment roller 20 and the first position adjustment mechanism 24 showing a specific structural example of the first position adjustment mechanism 24 provided with the pitch adjustment roller 20 shown in FIGS. 4 to 6. FIG. 9 is a partial longitudinal sectional view of the pitch adjustment roller 20 and the first position adjustment mechanism 24 showing an example of the pitch adjustment roller 20 moved downward by the first position adjustment mechanism 24 shown in FIG. 8.

As exemplified in FIGS. 8 and 9, each pitch adjustment roller 20 may have a structure including a cylindrical roller main body 20A whose both ends open, and a pair of bearings 20B whose outer rings are respectively fixed to both end portions of a through hole formed at the center of the roller main body 20A. In addition, annular flanges 20C for preventing the tape T from shifting in the width direction are formed at both ends of the cylindrical surface of the roller main body 20A. Thereby, a cylindrical surface portion of the roller main body 20A between the flanges 20C forms a surface of the pitch adjustment roller 20 that comes into contact with the tape T. In addition, a cylindrical spacer 20D can be disposed between the inner rings of the pair of the bearings 20B in order to support the inner rings in the axial direction.

On the other hand, the first position adjustment mechanism 24 can be composed of a pin bolt 40, a pusher 41 and at least one spring 42. The shaft portion of the pin bolt 40 is slidably inserted into the inner rings of the bearings 20B, thereby functioning as a rotating shaft that rotatably holds the pitch adjustment roller 20.

Therefore, the pin bolt 40 is inserted as the rotating shaft into through holes respectively formed in the two support frames 22A and 22B for holding the pitch adjustment roller 20. The shaft portion of the pin bolt 40 is rotatably inserted into the through hole of the support frame 22A on the head side of the pin bolt 40. On the other hand, an internal thread for tightening the external thread of the pin bolt 40 is formed in the through hole of the support frame 22B on the distal end side of the pin bolt 40. Therefore, when the pin bolt 40 is rotated, the pin bolt 40 moves in the length direction of the pin bolt 40 relative to the two support frames 22A and 22B. Meanwhile, it can also be said that the support frame 22B, having the internal thread, on the distal end side of the pin bolt 40 also serves as a component of the first position adjustment mechanism 24.

The pusher 41 for pressing the pitch adjustment roller 20 in the direction of the first rotation axis AX1 is fixed to a shaft portion of the pin bolt 40 disposed between the support frame 22A on the head side of the pin bolt 40 and the pitch adjustment roller 20. In the example shown in FIGS. 8 and 9, the pusher 41 including a retaining ring which contacts only the inner ring of the bearing 20B is fixed to the shaft of the pin bolt 40. As a matter of course, the pusher 41 may have a desired shape as long as the pusher 41 can press the inner ring of the bearing 20B in the direction of the first rotation axis AX1 without interfering with the rotation of the roller main body 20A.

On the other hand, the at least one spring 42 is disposed between the support frame 22B on the distal end side of the pin bolt 40 and the pitch adjustment roller 20. The at least one spring 42 pushes back the pitch adjustment roller 20 in the direction opposite to the direction in which the pusher 41 presses the pitch adjustment roller 20. In the example shown in FIGS. 8 and 9, ring-shaped disc springs having a same diameter are disposed in series so as to be rotatable relative to the shaft of the pin bolt 40 by inserting the shaft of the pin bolt 40 into the through holes of the disc springs. The size of each disc spring is determined so that the disc spring located closest to the pitch adjustment roller 20 may contact only the inner ring of the bearing 20B. Therefore, the pitch adjustment roller 20 can be pressed in the direction of the first rotation axis AX1 by the springs 42 without hindering the rotation of the roller main body 20A.

As a matter of course, the at least one spring 42 may be one or more springs, such as a coil spring, other than disc springs. When disc springs are used, the overall length of the springs 42 can be easily adjusted by changing the number of the disc springs. Accordingly, it is possible to adjust the overall length of the springs 42 according to an interval between the support frames 22A and 22B. Therefore, the first position adjustment mechanism 24 can be easily attached to the pitch adjustment roller 20 even when the interval between the support frames 22A and 22B cannot be easily changed as in the case of modifying the conventional pitch adjustment roller 31 shown in FIG. 7 by adding the first position adjustment mechanism 24.

When the position of the pusher 41 in the direction of the first rotation axis AX1 and the overall length of the at least one spring 42 are appropriately determined so that the pitch adjustment roller 20 may be sandwiched between the pusher 41 and the at least one spring 42 from both sides, the pitch adjustment roller 20 is located adjacent to the pusher 41 in the direction of the first rotation axis AX1. Therefore, when the pin bolt 40 is rotated to move the pin bolt 40 in the length direction, the pitch adjustment roller 20 can be moved in the first rotation axis AX1 direction which is the same as the length direction of the pin bolt 40.

The pusher 41, such as a retaining ring, may be fixed to the shaft portion of the pin bolt 40 disposed between the support frame 22B on the distal end side of the pin bolt 40 and the pitch adjustment roller 20 while the at least one spring 42, such as disc springs, may be disposed between the support frame 22A on the head side of the pin bolt 40 and the pitch adjustment roller 20. In other words, the orientation of the pin bolt 40 shown in FIGS. 8 and 9 may be reversed up and down.

In many cases, the pin bolt 40 is made of an iron-based metal, such as stainless steel or carbon steel. On the other hand, the support frames 22A and 22B, which hold and turn the pitch adjustment rollers 20, are also realistically made of an iron-based metal, such as stainless steel or carbon steel. Accordingly, the pusher 41 and the roller main body 20A can also be made of an iron-based metal, such as stainless steel or carbon steel.

The pin bolt 40 can be rotated by an operator using a wrench, such as a hexagonal bar wrench, a socket wrench, or an open wrench (spanner), depending on the shape of the head of the pin bolt 40. That is, the operator can manually adjust the position of the pitch adjustment roller 20 by rotating the pin bolt 40. This is because it is thought that it is not necessary to adjust the position of the pitch adjustment roller 20 while laminating the tape T in many cases as long as the position adjustment of the pitch adjusting roller 20 has been performed as maintenance of the fiber placement apparatus 1 before laminating the tape T for reducing the positional deviation of the tape T in the width direction as shown in FIG. 7. Nevertheless, the pin bolt 40 may be automatically rotated by a motor so that a more precise fine adjustment can be made while laminating the tape T or operator skill level can become unnecessary.

When a roller unit that sandwiches the tape T between a pair of rollers as exemplified in Japanese Patent Application Publication JP2022-130133A is used to feed out the tape T instead of the single pitch adjustment roller 20, the first position adjustment mechanism 24 including the pin bolt 40 can be attached to each of the rollers. Alternatively, one roller may be used as a main roller while the other roller may be used as a sub-roller, and then the first position adjustment mechanism 24 including the pin bolt 40 may be attached to only the main roller. In this case, the length of the sub-roller may be set to cover a movement range of the main roller.

Examples of a mechanical element other than the pin bolt 40 for composing the first position adjustment mechanism 24 also include a mechanism for reciprocating the pitch adjustment roller 20 in the direction of the first rotation axis AX1 by coupling the pitch adjustment roller 20 to an end portion of a rod expanding and contracting by a piston included in a cylinder mechanism, such as an air cylinder, an electric cylinder or a hydraulic cylinder, in which the piston coupled to the rod reciprocates inside a cylinder tube. Alternatively, a mechanism for reciprocating the pitch adjustment roller 20 in the direction of the first rotation axis AX1 by coupling the pitch adjustment roller 20 to a rack of a rack-and-pinion which is a kind of gears may also be used for composing the first position adjustment mechanism 24.

Figure 10:
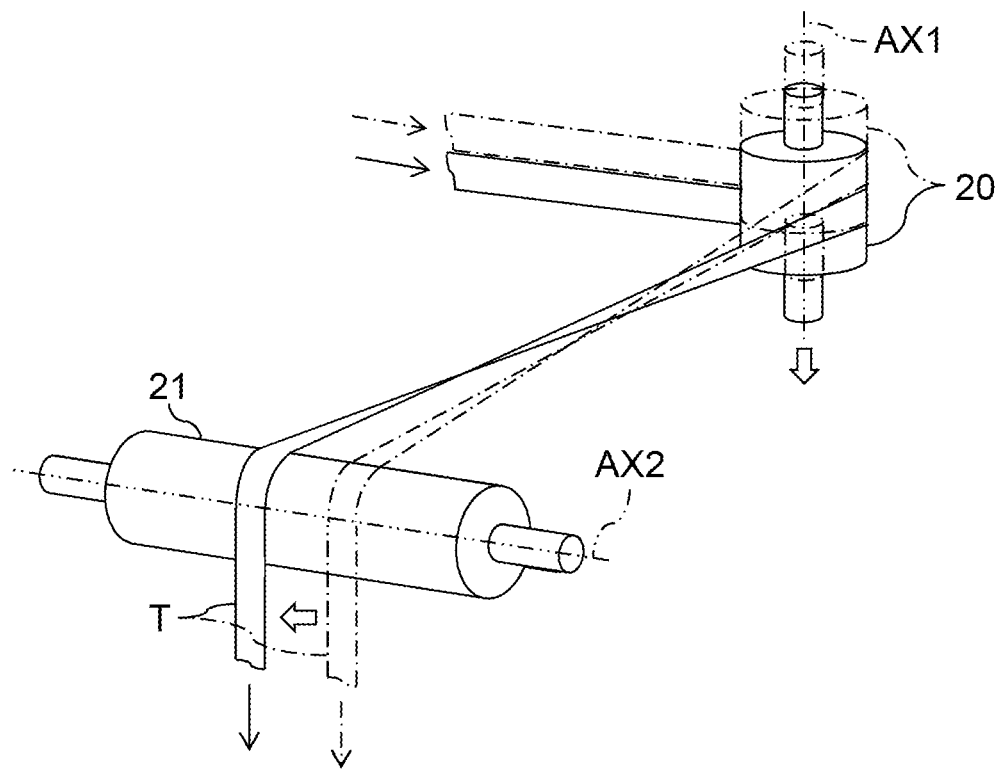
FIG. 10 explains a method for adjusting a position of the prepreg tape on the array roller using the first position adjustment mechanism exemplified in FIGS. 8 and 9.

FIG. 10 explains a method for adjusting a position of the prepreg tape T on the array roller 21 using the first position adjustment mechanism 24 exemplified in FIGS. 8 and 9.

When each tape T is twisted and fed out from the pitch adjustment roller 20 to the array roller 21 as shown in FIG. 10, each tape T theoretically takes the shortest route as long as frictional force and the like are ignored. When the pitch adjustment roller 20 having the flanges 20C is moved in the direction of the first rotation axis AX1, the tape T whose width direction is in the direction of the first rotation axis AX1 also moves in the direction of the first rotation axis AX1. Thereby, the shortest route of the tape T changes together with the shortest distance to the array roller 21 from a separation position of the tape T from the pitch adjustment roller 20. As a result, the position of the tape T can be slid in the width direction on the array roller 21 since the tape T is slidable in the width direction on the array roller 21.

As a specific example, when the pitch adjustment roller 20 whose first rotation axis AX1 is in the vertical direction is moved downward in a case where the tape T is twisted counterclockwise toward a traveling direction of the tape T to be fed out from the pitch adjustment roller 20 to the array roller 21, as exemplified in FIG. 10, the tape T slides to the right toward the traveling direction of the tape T on the array roller 21 whose second rotation axis AX2 is in the horizontal direction.

Therefore, adjusting the positions of the pitch adjustment rollers 20 in the first rotation axis AX1 directions by the first position adjustment mechanisms 24 respectively allows adjusting the positions of the tapes T on the array roller 21 in the width direction. That is, a positional deviation of each tape T on the array roller 21 in the width direction can be corrected, and thereby the pitch of the tapes T on the array roller 21 can be set to a targeted pitch corresponding to an interval of the first rotation axes AX1.

When it is physically difficult to provide the first position adjustment mechanisms 24 for all the pitch adjustment rollers 20 due to interference or the like, or it is not preferable to provide the first position adjustment mechanisms 24 for all the pitch adjustment rollers 20, the first position adjustment mechanism 24 may be provided only on at least one pitch adjustment roller 20 that can be provided with the first position adjustment mechanism 24, as described above. In other words, at least one of the pitch adjustment rollers 20 may not be provided with the first position adjustment mechanism 24 for adjusting the position of the pitch adjustment roller 20 in the first rotation axis AX1 direction.

In that case, the position of at least one of the prepreg tapes T, fed out from the pitch adjustment rollers 20, in the width direction on the array roller 21 is adjusted by the first position adjustment mechanism 24. In other words, the position of at least one of the prepreg tapes T, fed out from the pitch adjustment rollers 20, in the width direction on the array roller 21 cannot be adjusted by any of the first position adjustment mechanisms 24.

As a specific example, when it is difficult to provide the first position adjustment mechanisms 24 on the two pitch adjustment rollers 20, closest to the pivot 23A of the turning mechanism 23 that turns the support frames 22, in order to avoid interference among heads of pin bolts, and a fitting 23B and the like for rotatably supporting the pivot 23A, the first position adjustment mechanisms 24 may not be provided with the two pitch adjustment rollers 20 closest to the pivot 23A as exemplified in FIGS. 4 to 6.

Instead, the array roller 21 can be provided with a second position adjustment mechanism 25 that adjusts the position of the array roller 21. The second position adjustment mechanism 25 is a device for adjusting the position of the array roller 21 at least in a direction perpendicular to the second rotation axis AX2. Therefore, the positions of the tapes T on the array roller 21 in the width direction, which cannot be adjusted by any of the first position adjustment mechanisms 24, can be adjusted by the second position adjustment mechanism 25. That is, a positional deviation of each tape T in the width direction, which cannot be corrected by any of the first position adjustment mechanisms 24, can be corrected by the second position adjustment mechanism 25.

Figure 11:
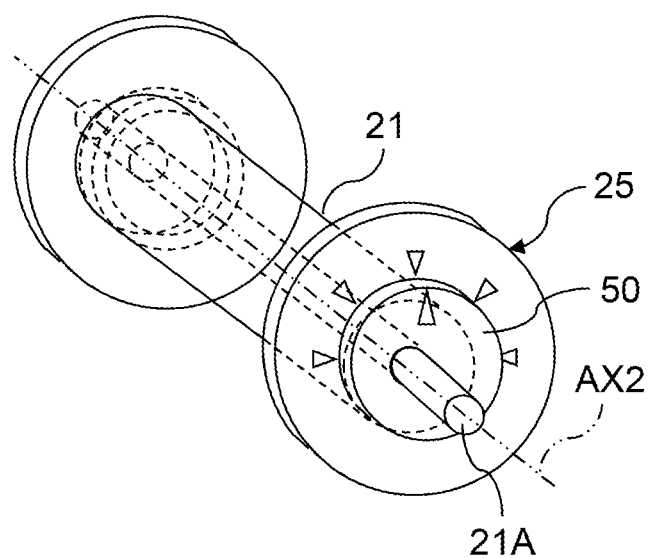
FIG. 11 is a perspective view of eccentric bushes and the array roller showing an example of using the eccentric bushes as the second position adjustment mechanism provided with the array roller shown in FIGS. 4 and 6.
Figure 12:
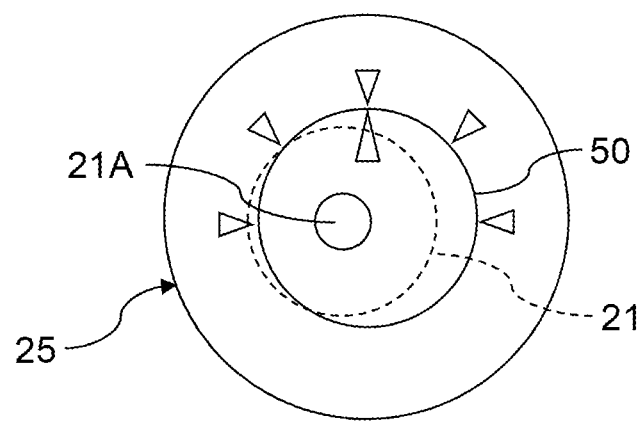
FIG. 12 is a front view of one of the eccentric bushes shown in FIG. 11.
Figure 13:
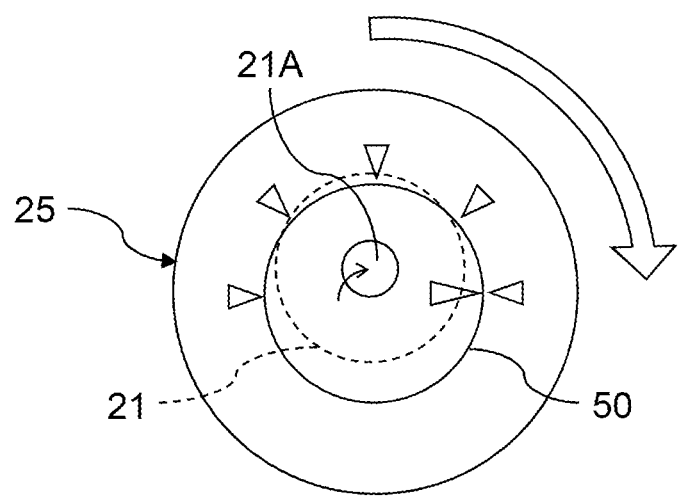
FIG. 13 shows an example of the eccentric bush shown in FIG. 12 rotated clockwise.

FIG. 11 is a perspective view of eccentric bushes 50 and the array roller 21 showing an example of using the eccentric bushes 50 as the second position adjustment mechanism 25 provided with the array roller 21 shown in FIGS. 4 and 6. FIG. 12 is a front view of one of the eccentric bushes 50 shown in FIG. 11. FIG. 13 shows an example of the eccentric bush 50 shown in FIG. 12 rotated clockwise.

As exemplified in FIGS. 11 to 13 and the like, a pair of the eccentric bushes 50 for changing positions of the second rotation axis AX2 can be disposed at both ends of the array roller 21 as the second position adjustment mechanism 25. Each of the eccentric bushes 50 rotates around a rotation axis eccentric from the second rotation axis AX2.

As shown in FIGS. 11 to 13, the rotation center of each of the eccentric bushes 50 and the second rotation axis AX2 of the array roller 21 are not on a same straight line but are locally parallel to each other. Therefore, when at least one of the eccentric bushes 50 is rotated from an initial position shown in FIG. 12, the position of the second rotation axis AX2 and a rotation shaft 21A of the array roller 21 can be changed along an arc on a plane perpendicular to the second rotation axis AX2 and the rotation shaft 21A as shown in FIG. 13.

When the array roller 21 is moved in a direction parallel to the first rotation axes AX1 of the pitch adjustment rollers 20, the same effect as that in a case where all the pitch adjustment rollers 20 are moved in the direction opposite to the moving direction of the array roller 21 in the first rotation axis AX1 direction as explained with reference to FIG. 10 can be obtained. That is, the positions of the tapes T on the array roller 21 in the width direction can be finely adjusted since the shortest paths of the tapes T from the pitch adjustment rollers 20 to the array roller 21 change.

In case of using the eccentric bushes 50 for changing the position of the array roller 21, the position of the array roller 21 in the direction perpendicular to both the first rotation axes AX1 of the pitch adjustment rollers 20 and the second rotation axis AX2 of the array roller 21 also changes. Therefore, strictly speaking, the shortest paths of the tapes T from the pitch adjustment rollers 20 to the array roller 21 change not only due to a change in the position of the array roller 21 in the first rotation axis AX1 direction, but also due to a change in the position of the array roller 21 in the direction perpendicular to both the first rotation axes AX1 and the second rotation axis AX2.

The eccentric bushes 50 disposed at both ends of the array roller 21 may be operated independently of each other. In that case, the second rotation axis AX2 of the array roller 21 may be slightly slanted from a direction before adjustment. That is, even when the second rotation axis AX2 of the array roller 21 is horizontal in the initial state, the second rotation axis AX2 may not be horizontal after position adjustment of the second rotation axis AX2 by the eccentric bushes 50. Therefore, the second rotation axis AX2 of the array roller 21 and each of the rotation axes of the eccentric bushes 50 are not necessarily parallel to each other from a large perspective.

In the example shown in FIGS. 11 to 13, an operator can directly and manually rotate the eccentric bush 50, which also serves as a dial, while referring to a scale. A lever or handle may be coupled to the eccentric bush 50. The rotation shaft 21A of the array roller 21 can be rotatably coupled to each of the eccentric bushes 50 by rotatably inserting the rotation shaft 21A of the array roller 21 into eccentric holes of the eccentric bushes 50, or forming an internal gear on each of the eccentric bushes 50 and fixing external gears, which respectively mesh with the internal gears of the eccentric bushes 50, on the rotation shaft 21A of the array roller 21.

Examples of a mechanical element or mechanical elements other than the eccentric bushes 50 for composing the second position adjustment mechanism 25 include: a mechanism having a pair of rod-shaped frames whose end portions each reciprocates like a rotary pendulum on a plane perpendicular to the second rotation axis AX2, which support both ends of the rotation shaft 21A of the array roller 21; a mechanism having a pair of rack-and-pinions or a pair of cylinder mechanisms, such as air cylinders, electric cylinders or hydraulic cylinders, which support both ends of the rotation shaft 21A of the array roller 21 and reciprocate both ends of the rotation shaft 21A in a direction perpendicular to the second rotation axis AX2; and a mechanism having moving pulleys or sprockets, which are respectively coupled to both ends of the rotation shaft 21A of the array roller 21, and belts, wires or chains, which respectively move the moving pulleys or sprockets in the vertical direction using the weight of the array roller 21.

When the position of the array roller 21 is adjusted by the second position adjustment mechanism 25, such as the eccentric bushes 50, the positions of all the tapes T that are in contact with the array roller 21 change simultaneously. Accordingly, it is reasonable to adjust the positions of the tapes T in contact with the array roller 21 by the second position adjustment mechanism 25, and subsequently adjust the positions of the tapes T whose positions can be adjusted by the first position adjustment mechanisms 24 respectively, individually by the first position adjustment mechanisms 24.

Method of Molding Composite Material

Next, a method of molding a composite material using the fiber placement apparatus 1 will be described.

Figure 14:
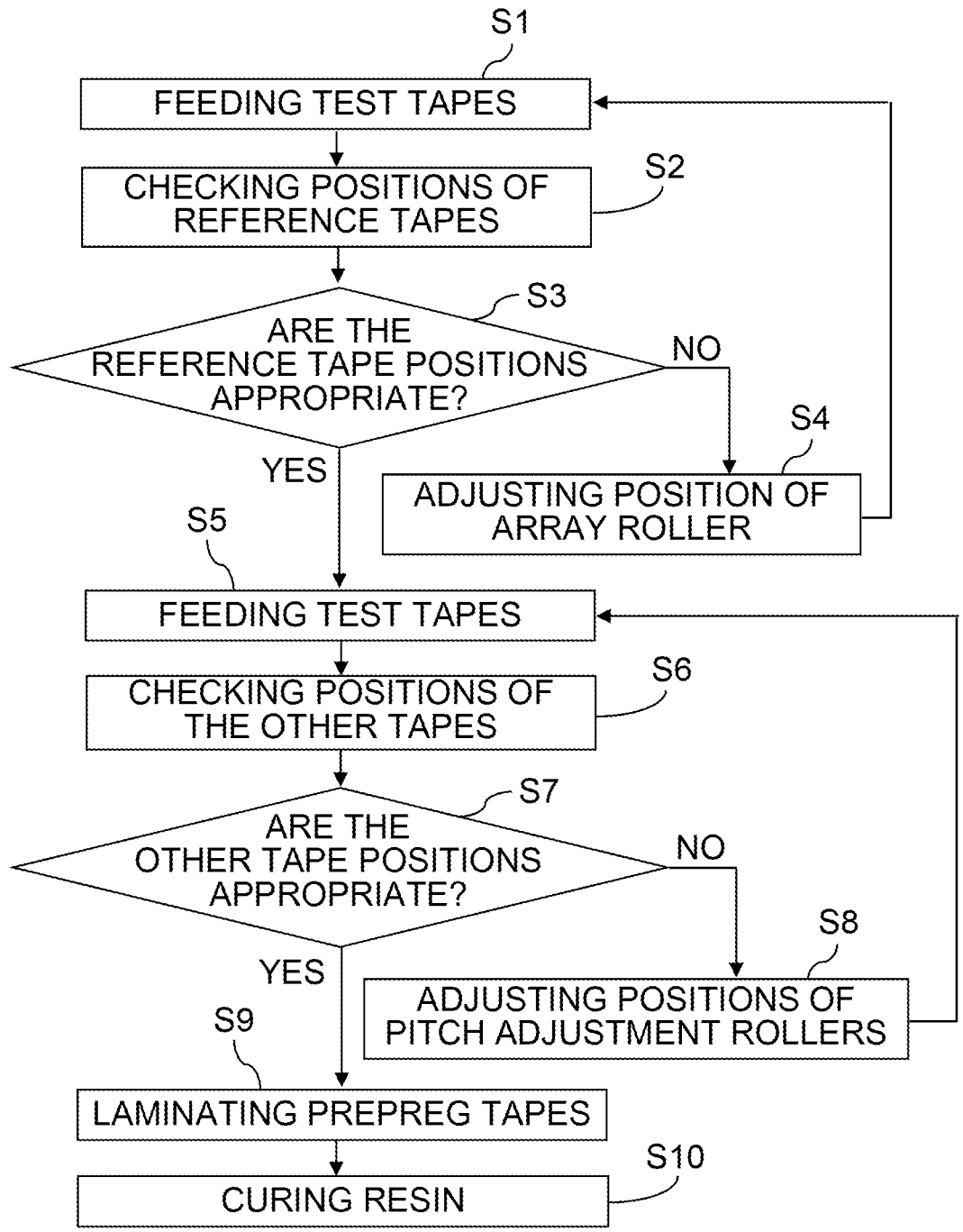
FIG. 14 is a flowchart showing a flow for molding an FRP using the fiber placement apparatus shown in FIG. 1.

FIG. 14 is a flowchart showing a flow for molding an FRP using the fiber placement apparatus 1 shown in FIG. 1.

In order to mold an FRP, a preform having a shape corresponding to a shape of the FRP after molding is first produced by laminating and shaping prepreg tapes T. For that purpose, the lamination jig J, having a simple shape, for laminating the prepreg tapes T as well as a shaping jig, having a complicated shape, for shaping a laminated body of the prepreg tapes T may be prepared separately. In this case, the laminated body of the prepreg tapes T laminated on the lamination jig J is transferred on the shaping jig and then shaped. Alternatively, the lamination jig J itself may be also used as the shaping jig.

The operation of laminating the prepreg tapes T on the lamination jig J is performed by the fiber placement apparatus 1 having the tape array device 12 exemplified in FIGS. 1 to 6. In addition, the positions of the pitch adjustment rollers 20 and the array roller 21 are adjusted prior to laminating the prepreg tapes T. Specifically, the prepreg tapes T are actually fed out from the fiber placement apparatus 1 on a trial basis, and then positions or intervals of the tapes T that have been fed out are checked. Subsequently, the respective positions of the pitch adjustment rollers 20 and the array roller 21 are adjusted based on the checked positions or intervals of the tapes T. When the test tapes T are fed out to adjust the positions of the pitch adjustment rollers 20 and the array roller 21, a jig other than the lamination jig J for producing the preform may be placed on the table 4.

As described above, the positions of the pitch adjustment rollers 20 are adjusted by the first position adjustment mechanisms 24 in the first rotation axis AX1 directions respectively. On the other hand, the position of the array roller 21 is adjusted by the second position adjustment mechanism 25 in a direction including a direction perpendicular to the second rotation axis AX2. Therefore, when one or more of the pitch adjustment rollers 20 are not provided with the first position adjustment mechanism 24 or the first position adjustment mechanisms 24, the positions of only the pitch adjustment rollers 20 provided with the first position adjustment mechanisms 24 are adjusted. When the second position adjustment mechanism 25 is omitted, the position of the array roller 21 is not adjusted, and the positions of only the pitch adjustment rollers 20 provided with the first position adjustment mechanisms 24 are adjusted.

When the array roller 21 is provided with the second position adjustment mechanism 25, such as the eccentric bushes 50, so that the positions of the tapes T fed out from the pitch adjustment rollers 20 which are not provided with the first position adjustment mechanisms 24 can be adjusted, as exemplified in FIGS. 11 to 13, it is reasonable to first finely adjust the positions of the tapes T fed out from the pitch adjustment rollers 20, which are not provided with the first position adjustment mechanisms 24, by adjusting the position of the array roller 21 with the second position adjustment mechanism 25, and subsequently finely adjust the positions of the tapes T to be fed out from the pitch adjustment rollers 20 provided with the first position adjustment mechanisms 24 by adjusting the positions of the pitch adjustment rollers 20 with the first position adjustment mechanisms 24 respectively.

Accordingly, in process S1, the prepreg tapes T same as the tapes T to be laminated for producing an FRP are fed out from the fiber placement apparatus 1 as test tapes T. For that purpose, the bobbins 10 wound with the prepreg tapes T having widths used for the lamination are set on the lamination head 2. At this time, the respective end portions of the tapes T are sandwiched between the power roller 14A and the support roller 14B included in the feed rollers 14.

Next, when the fiber placement apparatus 1 is operated under the control of the control device 5, the motor 14C for the feed rollers 14 is driven and thereby the power roller 14A is rotated. As a result, the end portions of the tapes T are fed out at a same feeding speed. That is, the tapes T passing through the width adjusting devices 11, the tape array device 12 and the at least one tension roller 13 from the bobbins 10 are fed out at a same feeding speed.

At this time, the turning mechanism 23 included in the tape array device 12 is driven under the control of the control device 5, and thereby the pitch adjustment rollers 20 turn around the pivot 23A. As a result, the pitch of the tapes T in the width direction is controlled.

When the end portions of the tapes T reach the surface of the lamination jig J, the feed structure 6 is driven under the integrated control by the control device 5, and thereby the lamination head 2 is moved in the direction opposite to a feeding direction of the tapes T. As a result, the compaction roller 16 is moved relatively to the lamination jig J and the like in the direction opposite to the feeding direction of the tapes T, and eventually the end portions of the tapes T are sandwiched between the compaction roller 16 and the lamination jig J. That is, the end portions of the tapes T reach the compaction roller 16.

Then, the cylinder mechanism 14D is driven under the integrated control by the control device 5, and thereby the power roller 14A is retracted from the tapes T. Accordingly, when the lamination head 2 is continuously moved in the direction opposite to the feeding direction of the tapes T, the tapes T are fed in the feeding direction. The feeding speed of the tapes T becomes a speed of the tapes T being fed out while receiving pressure from the compaction roller 16, i.e., a relative speed of the table 4, the lamination jig J and the like to the compaction roller 16 and the lamination head 2.

When the test tapes T are fed out to the lamination jig J or the like, it becomes possible to check the respective positions of the tapes T. Accordingly, in process S2, the tapes T whose positions are finely adjusted first, fed out from the pitch adjustment rollers 20 which are not provided with the first position adjustment mechanisms 24, can be considered as reference tapes, and the positions of the reference tapes can be checked.

When two or more of the pitch adjustment rollers 20 are not provided with the first position adjustment mechanisms 24 as exemplified in FIGS. 4 to 6, the number of the reference tapes is also plural. In that case, an interval between the reference tapes may be measured in addition to confirming the positions of the reference tapes. The positions and interval of the reference tapes can be measured as distances from a reference position or the like using a known measuring device, such as a scale or a tape measure.

Next, in process S3, it is determined whether the respective positions of the reference tapes are appropriate. Specifically, it is determined whether the respective positions of the reference tapes are target positions corresponding to the turning angle $\theta$ of the pitch adjustment rollers 20.

Then, when it has been determined that at least one of the positions of the reference tapes is not appropriate, the position of the array roller 21 is adjusted by the second position adjustment mechanism 25, such as the eccentric bushes 50, exemplified in FIGS. 11 to 13, in process S4. This position adjustment of the array roller 21 is repeated until it is determined in process S3 that each of the positions of the reference tapes is appropriate.

When it has been determined in process S3 that each of the positions of the reference tapes is appropriate, the test tapes T are continuously fed out in process S5 in a flow similar to that for feeding out the test tapes T in process S1. Thereby, it becomes possible to check the respective positions of the remaining tapes T other than the reference tapes, i.e., the tapes T fed out from the pitch adjustment rollers 20 provided with the first position adjustment mechanism 24, in process S6.

Next, in process S7, it is determined whether the respective positions of the remaining tapes T other than the reference tapes are appropriate. Specifically, it is determined whether the respective positions of the remaining tapes T other than the reference tapes are target positions corresponding to the turning angle $\theta$ of the pitch adjustment rollers 20.

Then, when it has been determined that at least one of the positions of the remaining tapes T other than the reference tapes is not appropriate, the position of at least one of the pitch adjustment rollers 20 which fed out the tape T whose position was not appropriate is adjusted in the direction of the first rotation axis AX1 with the first position adjustment mechanism 24 composed of the pin bolt 40 or the like exemplified in FIGS. 8 and 9, in process S8. This position adjustment of the at least one pitch adjustment roller 20 is repeated until it is determined in process S7 that all the positions of the tapes T are appropriate.

When it has been determined in process S7 that all the positions of the tapes T are appropriate, the prepreg tapes T for producing the preform can be laminated in process S9. That is, the prepreg tapes T can be arrayed in the width direction and laminated on the lamination jig J using the fiber placement apparatus 1.

The prepreg tapes T for producing the preform can be fed out similarly to the test tapes T. When the prepreg tapes T for producing the preform are fed out, the pitch adjustment rollers 20 and the array roller 21 are fixed at the adjusted positions respectively. Accordingly, the prepreg tapes T can be arrayed at accurate positions in the width direction respectively and then fed out at an accurate pitch.

In addition, when the prepreg tapes T for producing the preform are fed out, not only steering lamination in which the tapes T are fed out along a curved line, but also feeding out the tapes T onto the lamination jig J having concavity and convexity, and feeding out the tapes T while continuously changing the widths using the width adjusting devices 11 can be performed.

When the lamination head 2 reaches a lamination end position in the first ply, the cutter 15 is driven under the integrated control by the control device 5, and thereby the tapes T are cut. Subsequently, the feed structure 6 is driven under the integrated control by the control device 5, and thereby the lamination head 2 is moved to a lamination start position in the second ply. Then, lamination of the tapes T in the second ply can be started similarly to that in the first ply. Thus, when lamination of all the plies is completed, a laminated body of prepregs is produced. When a certain ply is divided into lamination areas and/or when the widths of the tapes T are varied discontinuously, cutting of the tapes T and resuming of lamination can be performed during lamination of a same ply.

When an FRP to be produced has a complicated shape like an aircraft part having a curved web and flange, it may be necessary to give the laminated body of the prepregs, placed on the lamination jig J, a shape corresponding to the shape of the FRP. In such a case, following the prepreg lamination process, a shaping process is performed to give the shape to the laminated body of the prepregs.

The laminated body of the prepregs can be shaped by heating with a heating device and pressurization. The pressurization can be performed by pressing a shaping mold to the laminated body of the prepregs with a pressing machine or applying atmospheric pressure to the laminated body of the prepregs by bagging. When the lamination jig J does not serve as a shaping mold, as described above, the laminated body of the prepregs is transferred from the lamination jig J on a shaping mold. Conversely, when the lamination jig J also serves as a shaping mold, the lamination jig J on which the laminated body of the prepregs is placed is transported to an area for carrying out the shaping process by bagging, a pressing machine, or the like.

When the shaping of the laminated body of the prepregs is completed, a preform having a shape corresponding to the shape of the FRP after molding is produced. In a case where the FRP has a simple shape like an aircraft panel, and therefore the preform can be produced only by laminating the prepreg tapes T on the lamination jig J having a shape for the shaping, the lamination and the shaping of the prepregs are performed at the same time.

Once the preform is produced, the resin included in the preform is cured in process S10. That is, a curing process of the resin with which the laminated and shaped prepreg tapes T is previously impregnated is performed. Thereby, the FRP having a target shape can be molded.

When the resin is a thermosetting resin, the curing process of the resin is performed by heating the resin using a heating device, such as an oven or an autoclave apparatus. On the other hand, when the resin is a thermoplastic resin, the curing process of the resin is performed by heating and melting the resin once with a heating device, and then cooling the resin by air cooling or the like. In addition, an assembly process for combining the preform with at least one other preform and/or at least one other intermediately cured FRP as well as placing at least one other dry preform to be molded by the RTM method on the preform, and subsequent injection of resin into the at least one dry preform may also be performed prior to curing the resin.

The lamination jig J or the shaping jig may be used as a molding jig for molding the FRP by curing the resin included in the preform. Alternatively, a molding jig may be prepared separately, and the preform may be transferred from the lamination jig J or the shaping jig to the molding jig.

As described above, in the fiber placement apparatus 1 and the method of molding a composite material, the prepreg tapes T whose pitch has been adjusted with the pitch adjustment rollers 20 are twisted to be fed out to the array roller 21, and then the tapes T are arrayed in the width direction with the array roller 21 so as to be laminated. In addition, at least one of the pitch adjustment rollers 20 can be moved in the direction of the first rotation axis AX1 with the first position adjustment mechanism 24.

Therefore, according to the fiber placement apparatus 1 and the method of molding a composite material, the position of the prepreg tape T to be fed out from at least one of the pitch adjustment rollers 20 provided with the first position adjustment mechanism 24 can be corrected even when the position of the tape T was shifted in the width direction of the tape T on the array roller 21. That is, it is possible to finely adjust the position of the tape T in the width direction by adjusting the position of the pitch adjusting roller 20 itself in the direction of the first rotation axis AX1 in addition to controlling the interval between the adjacent pitch adjustment rollers 20.

In addition, adjusting the position of the array roller 21 by the second position adjustment mechanism 25 allows correcting all the positions of the tapes T to appropriate positions. That is, the lamination accuracy of the prepreg tapes T by the fiber placement apparatus 1 can be improved. As a result, it becomes possible to laminate the prepreg tapes T at an appropriate interval and thereby produce a high-quality preform and FRP.

Other Embodiments

While certain embodiments have been described, these embodiments have been presented by way of example only and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

In order to mold an FRP (fiber reinforced plastic), such as a GFRP (glass fiber reinforced plastic) or a CFRP (carbon fiber reinforced plastic), which is also referred to as a composite material, prepreg sheets formed of fiber sheets impregnated with uncured resin are laminated, and subsequently cure the resin. Alternatively, fiber sheets which have not been impregnated with resin are laminated, and subsequently the laminated fiber sheets with the resin are impregnated and the resin is cured. The method of molding an FRP of impregnating fibers with resin after laminating the fibers is referred to as an RTM (Resin Transfer Molding) method.

In recent years, an AFP (Automated Fiber Placement) apparatus for automatically laminating prepreg tapes or fiber tapes is commercially available, and therefore a prepreg tape as well as a fiber tape, which has not been impregnated with resin, called a dry tape is also commercially available for lamination with an AFP apparatus.

When tape materials, such as prepreg tapes or dry tapes, are laminated with an AFP apparatus, laminating the tape materials simultaneously can improve the lamination efficiency, i.e., the length of the tape material laminated per unit time. Accordingly, an AFP apparatus having lamination heads is also devised so that tape materials can be laminated simultaneously (for example, refer to Japanese Patent Application Publication JP2011-527648A and Japanese Patent Application Publication JP2020-059145A).

In addition, an AFP apparatus which can feed out prepreg tapes from a common roller with a different total width by arraying the prepreg tapes in the width direction with changing an overlap amount between adjacent tapes, or by changing the respective widths of the tapes is also proposed (for example, refer to Japanese Patent Application Publication JP2022-046379A and Japanese Patent Application Publication JP2022-130133A).

The AFP apparatus described in Japanese Patent Application Publication JP2022-130133A has width adjustment mechanisms, for changing widths of prepreg tapes, whose number is same as that of the prepreg tapes. Therefore, prepreg tapes whose widths have been adjusted by the width adjustment mechanisms respectively can be arrayed in the width direction with no gap, and then fed out to a table with a common roller called a compaction roller.

In order to avoid increasing a head of an AFP apparatus and interference among parts included in the head, it is often necessary to twist one or more prepreg tapes for feeding out prepreg tapes from width adjustment mechanisms to a compact roller as described in Japanese Patent Application Publication JP2022-130133A. For that purpose, the rotation axis of a roller on the upstream side for feeding out a prepreg tape and the rotation axis of a roller on the downstream side are placed at skew positions.

However, a position of a twisted prepreg tape is sometimes shifted from a target pathway due to the quality of the prepreg tape, and/or when there is a non-negligible physical error in a position of a roller for feeding the prepreg tape or the like. This is because feeding out prepreg tapes, having variable widths, arrayed in the width direction with no gap requires slidably feeding out the prepreg tapes with a common roller. That is, when twisted prepreg tapes are fed out to a common roller, each prepreg tape may slip in the width direction on the common roller, and thereby may not pass through a target position.

When a position of a prepreg tape is shifted in the width direction with a non-negligible shift amount, an undesired gap or overlap is generated between prepreg tapes adjacent to each other in the width direction. Accordingly, a positional displacement of a non-negligible amount of a prepreg tape in the width direction leads to the quality deterioration of a preform produced by laminating prepreg tapes. That is, the lamination accuracy of prepreg tapes required for an AFP apparatus may not be obtained in some cases.

In an embodiment of the present invention, the amounts of positional displacement of prepreg tapes in the width direction is reduced in an AFP apparatus of prepreg tapes which twists the prepreg tapes for arraying the prepreg tapes in the width direction on a common roller, and then slidably feeds out the arrayed prepreg tapes by the common roller.

A fiber placement apparatus for arraying prepreg tapes in a width direction and laminating the arrayed prepreg tapes according to an embodiment of the present invention includes first rollers and a second roller. Each of the prepreg tapes is a material of a fiber reinforced plastic. The first rollers feed out the prepreg tapes one by one. The first rollers rotate around first rotation axes. The second roller arrays the prepreg tapes, fed out from the first rollers, in the width direction, and feeds out the arrayed prepreg tapes slidably. The second roller rotates around a second rotation axis lying on a skew position with respect to each of the first rotation axes. At least one first roller of the first rollers is provided with a first position adjustment mechanism that adjusts a position of the at least one first roller in a first rotation axis direction of the at least one first roller.

Further, a method of molding a composite material according to an embodiment of the present invention includes laminating the prepreg tapes using the above-mentioned fiber placement apparatus and curing resin included in the prepreg tapes. The position of the at least one first roller in the first rotation axis direction is adjusted with the first position adjustment mechanism prior to the laminating the prepreg tapes.

Obviously, numerous modifications and variations of the present invention are possible in light of the above teachings. It is therefore to be understood that within the scope of the appended claims, the invention may be practiced otherwise than as specifically described herein.

The invention claimed is:

1. A fiber placement apparatus for arraying prepreg tapes in a width direction and laminating the arrayed prepreg tapes, comprising:
　a plurality of first rollers configured to rotate around respective first rotation axes and feed out prepreg tapes one by one; and
　a second roller configured to rotate around a second rotation axis lying on a skew position with respect to each of the first rotation axes, array the prepreg tapes fed out from the first rollers in the width direction and feed out the prepreg tapes slidably,
　wherein at least one of the first rollers has a first position adjuster that adjusts a position of the at least one of the first rollers in a first rotation axis direction of the at least one of the first rollers, and each of the prepreg tapes is a material of a fiber reinforced plastic.

2. The fiber placement apparatus according to claim 1, wherein the second roller has a second position adjuster that adjusts a position of the second roller in at least a direction perpendicular to the second rotation axis.

3. The fiber placement apparatus according to claim 1, wherein the first position adjuster includes a pin bolt serving as a rotating shaft for rotatably holding the at least one of the first rollers, a pusher that is fixed to the pin bolt and pushes the at least one of the first rollers in the first rotation axis direction, and a spring configured to push back the at least one of the first rollers in a direction opposite to a pushing direction of the at least one of the first rollers by the pusher.

4. The fiber placement apparatus according to claim 2, wherein the second position adjuster includes an eccentric bush rotating around a rotation axis eccentric from the second rotation axis.

5. A method of molding a composite material, comprising:
　laminating the prepreg tapes using the fiber placement apparatus of claim 1; and
　curing resin in the prepreg tapes,
　wherein the position of the at least one of the first rollers in the first rotation axis direction is adjusted with the first position adjuster prior to the laminating the prepreg tapes.

6. The fiber placement apparatus according to claim 2, wherein the first position adjuster includes a pin bolt serving as a rotating shaft for rotatably holding the at least one of the first rollers, a pusher that is fixed to the pin bolt and pushes the at least one of the first rollers in the first rotation axis direction, and a spring configured to push back the at least one of the first rollers in a direction opposite to a pushing direction of the at least one of the first rollers by the pusher.

7. The fiber placement apparatus according to claim 6, wherein the second position adjuster includes an eccentric bush rotating around a rotation axis eccentric from the second rotation axis.

8. A method of molding a composite material, comprising:
   laminating the prepreg tapes using the fiber placement apparatus of claim 2; and
   curing resin in the prepreg tapes,
   wherein the position of the at least one of the first rollers in the first rotation axis direction is adjusted with the first position adjuster prior to the laminating the prepreg tapes.

9. A method of molding a composite material, comprising:
   laminating the prepreg tapes using the fiber placement apparatus of claim 3; and
   curing resin in the prepreg tapes,
   wherein the position of the at least one of the first rollers in the first rotation axis direction is adjusted with the first position adjuster prior to the laminating the prepreg tapes.

10. A method of molding a composite material, comprising:
    laminating the prepreg tapes using the fiber placement apparatus of claim 4; and
    curing resin in the prepreg tapes,
    wherein the position of the at least one of the first rollers in the first rotation axis direction is adjusted with the first position adjuster prior to the laminating the prepreg tapes.

11. A method of molding a composite material, comprising:
    laminating the prepreg tapes using the fiber placement apparatus of claim 6; and
    curing resin in the prepreg tapes,
    wherein the position of the at least one of the first rollers in the first rotation axis direction is adjusted with the first position adjuster prior to the laminating the prepreg tapes.

12. A method of molding a composite material, comprising:
    laminating the prepreg tapes using the fiber placement apparatus of claim 7; and
    curing resin in the prepreg tapes,
    wherein the position of the at least one of the first rollers in the first rotation axis direction is adjusted with the first position adjuster prior to the laminating the prepreg tapes.

* * * * *